US009839902B2

(12) United States Patent
Suzuki et al.

(10) Patent No.: US 9,839,902 B2
(45) Date of Patent: Dec. 12, 2017

(54) CATALYTIC CONVERTER (71) Applicant: TOYOTA JIDOSHA KABUSHIKI KAISHA, Toyota-shi, Aichi (JP)

(72) Inventors: Hiromasa Suzuki, Toyota (JP); Takeru Yoshida, Miyoshi (JP); Yoshinori Saito, Toyota (JP); Mitsuyoshi Okada, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/042,877

(22) Filed: Feb. 12, 2016

(65) Prior Publication Data

US 2016/0279613 A1 Sep. 29, 2016

(30) Foreign Application Priority Data

Mar. 23, 2015 (JP) ................. 2015-059384

(51) Int. Cl.
| | |
|---|---|
| *B01J 23/10* | (2006.01) |
| *B01J 23/63* | (2006.01) |
| *B01J 35/00* | (2006.01) |
| *B01J 35/10* | (2006.01) |
| *B01J 37/02* | (2006.01) |

(Continued)

(52) U.S. Cl.
CPC ........... *B01J 23/63* (2013.01); *B01J 35/0006* (2013.01); *B01J 35/1009* (2013.01); *B01J 35/1014* (2013.01); *B01J 37/0244* (2013.01); *B01D 53/9422* (2013.01); *B01D 2255/1021* (2013.01); *B01D 2255/1025* (2013.01); *B01D 2255/2092* (2013.01); *B01D 2255/20715* (2013.01); *B01D 2255/407* (2013.01); *B01D 2255/906* (2013.01); *B01D 2255/9022* (2013.01); *B01J 35/04* (2013.01); *B01J 37/0248* (2013.01); *B01J 2523/00* (2013.01)

(58) Field of Classification Search
CPC ........ B01J 23/63; B01J 35/04; B01J 35/0006
USPC ...................................................... 502/304
See application file for complete search history.

(56) References Cited

U.S. PATENT DOCUMENTS

2006/0217263 A1* 9/2006 Kawamoto .......... B01D 53/945
502/304
2012/0021899 A1 1/2012 Nobukawa et al.

FOREIGN PATENT DOCUMENTS

JP 2010-201284 A 9/2010
JP 2012-24701 A 2/2012

* cited by examiner

*Primary Examiner* — Haytham Soliman
(74) *Attorney, Agent, or Firm* — Sughrue Mion, PLLC (57) ABSTRACT

A catalytic converter with excellent OSC performance and $NO_x$ purification performance. The converter includes a substrate with a cell structure through which exhaust gas flows, and a catalyst layer formed on a cell wall surface of the substrate. The catalyst layer includes a lower catalyst layer and an upper catalyst layer, the lower catalyst layer being formed on a surface of the substrate, and the upper catalyst layer being formed on a surface of the lower catalyst layer. The upper catalyst layer includes at least a zirconia support with rhodium carried thereon, and two types of ceria-zirconia-based composite oxides with different specific surface areas, each of the ceria-zirconia-based composite oxides having no rhodium carried thereon. The lower catalyst layer includes an alumina support with platinum carried thereon, and a ceria-zirconia-based composite oxide.

2 Claims, 6 Drawing Sheets

(51) Int. Cl.
*B01J 35/04* (2006.01)
*B01D 53/94* (2006.01)

FIG. 6 ued States Patent US 9,839,902 B2

CATALYTIC CONVERTER

CLAIM OF PRIORITY

The present application claims priority from Japanese patent application JP 2015-059384 filed on Mar. 23, 2015, the content of which is hereby incorporated by reference into this application.

BACKGROUND

Technical Field

The present invention relates to a catalytic converter that is fixedly housed in a pipe of an exhaust system for exhaust gas.

Background Art

In a variety of industries, a variety of attempts has been made worldwide to reduce environmental impacts and burdens. In particular, in the automobile industry, development for promoting the spread of not only fuel-efficient gasoline engine vehicles, but also so-called eco-friendly vehicles, such as hybrid vehicles and electric vehicles, as well as for further improving the performance of such vehicles has been advanced day by day. In addition to the development of such eco-friendly vehicles, research about an exhaust gas purifying catalyst for purifying exhaust gas discharged from an engine has also been actively conducted. An exhaust gas purifying catalyst contains an oxidation catalyst, a three-way catalyst, a $NO_x$ storage-reduction catalyst, and the like. A noble metal catalyst, such as platinum (Pt), palladium (Pd), or rhodium (Rh), exhibits catalytic activity in the exhaust gas purifying catalyst. The noble metal catalyst is typically used while being carried on a support that is made of porous oxide, such as alumina ($Al_2O_3$).

A catalytic converter for purifying exhaust gas is typically arranged in an exhaust system for exhaust gas that connects a vehicle engine and a muffler. The engine may sometimes discharge environmentally harmful substances, such as CO, $NO_x$, and unburned HC and VOC. In order to convert such harmful substances into allowable substances, exhaust gas is passed through a catalytic converter in which a catalyst layer, which has a noble metal catalyst, such as Rh, Pd, or Pt carried on a support, is arranged on the cell wall surface of a substrate, so that CO is converted into $CO_2$, and $NO_x$ is converted into $N_2$ and $O_2$, while HC and VOC are burned to generate $CO_2$ and $H_2O$.

As a support on which a noble metal catalyst is carried, a ceria-zirconia-based composite oxide (which is also referred to as a $CeO_2$—$ZrO_2$ solid solution, a CZ material, and the like) can be used. This is also referred to as a promoter, and is an essential component of the aforementioned three-way catalyst for concurrently removing CO, $NO_x$, and HC that are harmful components in the exhaust gas. Examples of the essential component of the promoter include $CeO_2$. $CeO_2$ has a property that its oxidation number changes to $Ce^{3+}$ or $Ce^{4+}$, for example, depending on the partial pressure of oxygen in the exhaust gas to which $CeO_2$ is exposed, and has a function of absorbing and releasing oxygen as well as a function of storing oxygen (OSC: Oxygen Storage Capacity) to compensate for the deficiency and excess of electric charges. In addition, $CeO_2$ can absorb and mitigate fluctuations of the exhaust gas atmosphere and maintain the air/fuel ratio at a level around the theoretical air/fuel ratio in order to retain a purifying window of the three-way catalyst.

By the way, how to reduce the amount of a noble metal catalyst used in the aforementioned three-way catalyst is an important element to be considered from the perspective of cost competitiveness. However, when the amount of a noble metal catalyst in a three-way catalyst is significantly reduced, the catalytic activity also decreases significantly. Thus results in significantly degraded OSC performance and low-temperature activity as well as significantly degraded $NO_x$ purification performance under a high-temperature environment, and the like. This occurs because a significantly reduced amount of a noble metal catalyst results in a significantly reduced number of active sites, and a significantly reduced number of catalytic reaction sites results in significantly degraded purification performance.

Among noble metal catalysts, such as Pt, Pd, and Rh, that are particularly used for a three-way catalyst, Rh is the most excellent in the $NO_x$ purification performance, but is sold at the highest market price per unit weight. It has been known that when Rh is carried on a support that contains cerium oxide (ceria), higher OSC performance is exhibited. To the contrary, it has been also known that increasing the amount of cerium oxide in the support will degrade the $NO_x$ purification performance that is a characteristic of Rh. Thus, when using Rh as a noble metal catalyst for a three-way catalyst, producing a three-way catalyst that is optimal in both the OSC performance and the $NO_x$ purification performance is an urgent object to be achieved in the technical field.

Herein, Patent Document 1 discloses an exhaust gas purifying catalyst including a first oxygen storage material on which no noble metal is carried and that has a pyrochlore phase type regular array structure; and a second oxygen storage material that has a higher oxygen storage rate and a lower oxygen storage capacity than the first oxygen storage material, in which a platinum group noble metal is carried on the second oxygen storage material. According to such an exhaust gas purifying catalyst, it is possible to provide an exhaust gas purifying catalyst that has high $NO_x$ purification performance after endurance.

Meanwhile, Patent Document 2 discloses an exhaust gas purifying catalyst having a first catalyst layer and a second catalyst layer that are sequentially formed on a support substrate, the first catalyst layer having rhodium carried thereon, and the second catalyst layer having platinum and palladium carried thereon, in which the ratio of the carried amount of palladium (y) to the carried amount of platinum (x) (y/x; molar ratio) satisfies 0<y/x≤1.0. According to such an exhaust gas purifying catalyst, it is possible to provide an exhaust gas purifying catalyst of a $NO_x$ storage-reduction type that has more excellent $NO_x$ purification performance.

By the way, when rhodium is carried on ceria, metallization of the rhodium is hindered, and the $NO_x$ purification performance is thus degraded as described above. Meanwhile, when the amount of ceria is increased to increase the oxygen storage capacity, a pressure loss is increased.

That is, even when the exhaust gas purifying catalyst disclosed in Patent Document 1 or 2 is used, it is unclear whether or not a catalytic converter that is excellent in both the OSC performance and the $NO_x$ purification performance can be provided.

RELATED ART DOCUMENTS

Patent Documents

Patent Document 1: JP 2012-024701 A
Patent Document 2: JP 2010-201284 A

SUMMARY

The present invention has been made in view of the foregoing problems, and it is an object of the present invention to provide a catalytic converter with excellent OSC performance and $NO_x$ purification performance.

In order to achieve the above object, a catalytic converter in accordance with the present invention includes a substrate with a cell structure through which exhaust gas flows, and a catalyst layer formed on a cell wall surface of the substrate. The catalyst layer includes a lower catalyst layer and an upper catalyst layer, the lower catalyst layer being formed on a surface of the substrate, and the upper catalyst layer being formed on a surface of the lower catalyst layer. The upper catalyst layer includes at least a zirconia support with rhodium carried thereon, and two types of ceria-zirconia-based composite oxides with different specific surface areas, each of the ceria-zirconia-based composite oxides having no rhodium carried thereon. The lower catalyst layer includes an alumina support with platinum carried thereon, and a ceria-zirconia-based composite oxide.

The catalytic converter of the present invention is characterized by having a catalyst layer with a two-layer structure of a lower catalyst layer, which is formed on the surface of a substrate, and an upper catalyst layer formed thereon, in which the upper catalyst layer includes at least a zirconia support with rhodium carried thereon, and two types of ceria-zirconia-based composite oxides with different specific surface areas, each of the ceria-zirconia-based composite oxides having no rhodium carried thereon. The inventors have verified that as rhodium is carried on a support that does not contain ceria, the activity of the rhodium is increased and the $NO_x$ purification rate is thus increased. In addition, as the upper catalyst layer includes two types of ceria-zirconia-based composite oxides with different specific surface areas, more specifically, as the upper catalyst layer contains a ceria-zirconia-based composite oxide with a large specific surface area, the $NO_x$ purification rate is increased, while as the upper catalyst layer also contains a ceria-zirconia-based composite oxide with a small specific surface area, an increase in the pressure loss can be suppressed.

Herein, as the substrate with a cell structure, it is possible to use, in addition to cordierite made of a composite oxide of magnesium oxide, aluminum oxide, and silicon dioxide, or ceramic materials, such as silicon carbide, materials other than ceramic materials, such as metal materials. In addition, the substrate may have a so-called honeycomb structure with a number of cells whose lattice contour is a quadrangle, a hexagon, an octagon, or the like.

The lower catalyst layer that is formed on the cell wall surface of the substrate contains alumina ($Al_2O_3$), which is a support, and platinum (Pt) carried thereon, and further contains a ceria-zirconia-based composite oxide ($CeO_2$—$ZrO_2$ composite oxide).

Meanwhile, the upper catalyst layer may contain, as described above, zirconia ($ZrO_2$), which is a support, and rhodium (Rh) carried thereon, and also contains two types of ceria-zirconia-based composite oxides ($CeO_2$—$ZrO_2$ composite oxides) with different specific surface areas (SSA), and may further contain alumina ($Al_2O_3$).

Herein, according to a preferred embodiment of the catalytic converter in accordance with the present invention, of the two types of ceria-zirconia-based composite oxides with different specific surface areas, the ceria-zirconia-based composite oxide with a larger specific surface area has a specific surface area of greater than or equal to 40 $m^2/g$, and is contained in the upper catalyst layer by an amount of greater than or equal to 12 g/L, while the ceria-zirconia-based composite oxide with a smaller specific surface area has a specific surface area of less than or equal to 4 $m^2/g$, and is also contained in the upper catalyst layer by an amount of greater than or equal to 8 g/L.

In the present invention, of the two types of ceria-zirconia-based composite oxides with different specific surface areas, the "ceria-zirconia-based composite oxide with a larger specific surface area" has a specific surface area of greater than or equal to 40 $m^2/g$, while the "ceria-zirconia-based composite oxide with a smaller specific surface area" has a specific surface area of less than or equal to 4 $m^2/g$.

The inventors have identified that when each of the ceria-zirconia-based composite oxide with a larger specific surface area is contained by an amount of greater than or equal to 12 g/L in the upper layer and the ceria-zirconia-based composite oxide with a smaller specific surface area is contained in the upper catalyst layer by an amount of greater than or equal to 8 g/L, it is possible to suppress a pressure loss while exhibiting excellent OSC performance.

In addition, the zirconia support with rhodium carried thereon is preferably contained in the upper catalyst layer by an amount of 40 g/L.

When the amount of the zirconia support with rhodium carried thereon is increased, the low-temperature activity is improved, in particular. However, if the amount of the zirconia support is increased too much, a pressure loss is increased. Thus, from the perspective of achieving both excellent low-temperature activity and suppressed pressure loss, the preferable amount of the zirconia support with rhodium carried thereon is defined as 40 g/L.

Further, in another embodiment of the catalytic converter in accordance with the present invention, the upper catalyst layer is formed in the range of 80% of the total length of the substrate from an end of the substrate on the downstream side of the exhaust gas flow direction, while the lower catalyst layer is formed in the range of 80% of the total length of the substrate from an end of a substrate on the upstream side of the exhaust gas flow direction. It should be noted that each of the upper catalyst layer and the lower catalyst layer is preferably formed in the range of 65 to 95% of the total length of the substrate.

The catalytic converter of the present invention preferably has a cordierite honeycomb support with excellent resistance to thermal shock. Alternatively, the catalytic converter may be an electrically heated converter (EHC). The electrically heated catalytic converter of this type has a honeycomb catalyst and a pair of electrodes attached thereto. When current is supplied to the pair of electrodes to heat the honeycomb catalyst, the activity of the honeycomb catalyst is increased, so that exhaust gas passing through the honeycomb catalyst is detoxified. When such a converter is applied to an exhaust system for exhaust gas that connects a vehicle engine and a muffler, it is possible to purify exhaust gas at room temperature and also purify exhaust gas at cold temperature by activating the catalyst through electric heating.

As can be understood from the foregoing description, the catalytic converter of the present invention has a catalyst layer with a two-layer structure of a lower catalyst layer, which is formed on the surface of a substrate, and an upper catalyst layer formed thereon. The upper catalyst layer includes at least a zirconia support with rhodium carried thereon, and two types of ceria-zirconia-based composite oxides with different specific surface areas, each of the ceria-zirconia-based composite oxides having no rhodium carried thereon. Thus, it is possible to provide a catalyst converter with excellent OSC performance and $NO_x$ purification performance while at the same time suppressing a pressure loss.

DETAILED DESCRIPTION OF THE EMBODIMENT(S)

Hereinafter, embodiments of a catalytic converter of the present invention will be described with reference to the drawings. The catalytic converter shown in the drawings has an upper catalyst layer that is formed in the range of 80% of the total length of a substrate from an end of the substrate on the downstream side of the exhaust gas flow direction, and also has a lower catalyst layer that is formed in the range of 80% of the total length of the substrate from an end of the substrate on the upstream side of the exhaust gas flow direction. It should be noted that the length over which each of the upper catalyst layer and the lower catalyst layer is formed is preferably in the range of 65 to 95% of the total length of the substrate.

(Exhaust System for Exhaust Gas)

First, an exhaust system for exhaust gas in which the catalytic converter of the present invention is provided will be briefly described. An exhaust system for exhaust gas to which the catalytic converter of the present invention is applied has a configuration in which an engine, a catalytic converter, a three-way catalytic converter, a sub-muffler, and a main muffler are arranged and are mutually connected with system pipes so that exhaust gas generated in the engine flows through each part via the system pipe and is then discharged. Next, an embodiment of the catalytic converter will be described.

(Embodiment of Catalytic Converter)

Figure 1:
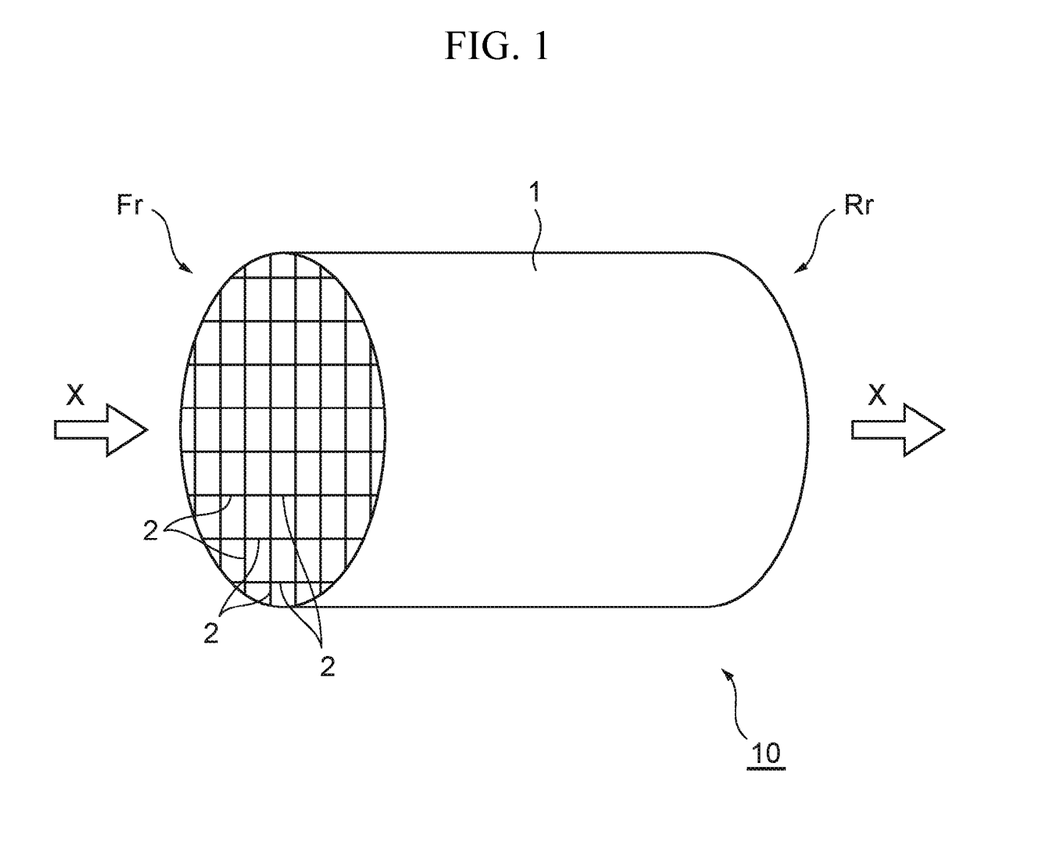
FIG. 1 is a schematic view of a catalytic converter of the present invention.
Figure 2:
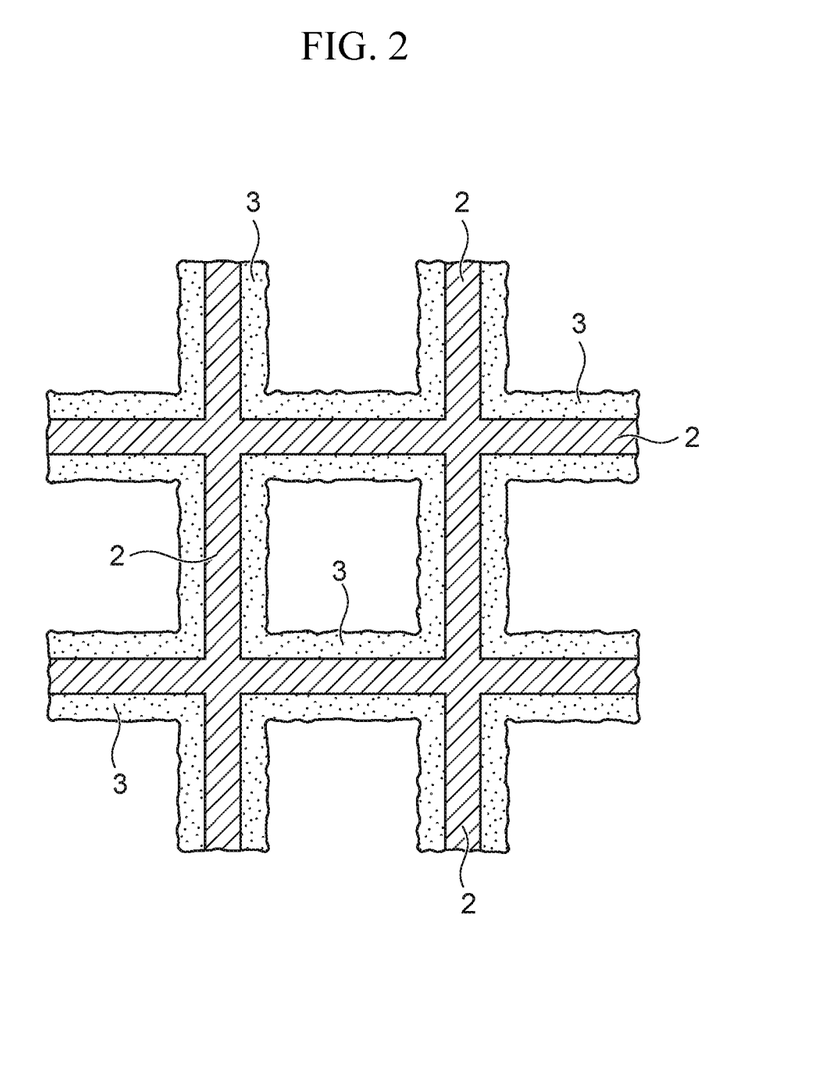
FIG. 2 is a partially enlarged view of a cell.
Figure 3:
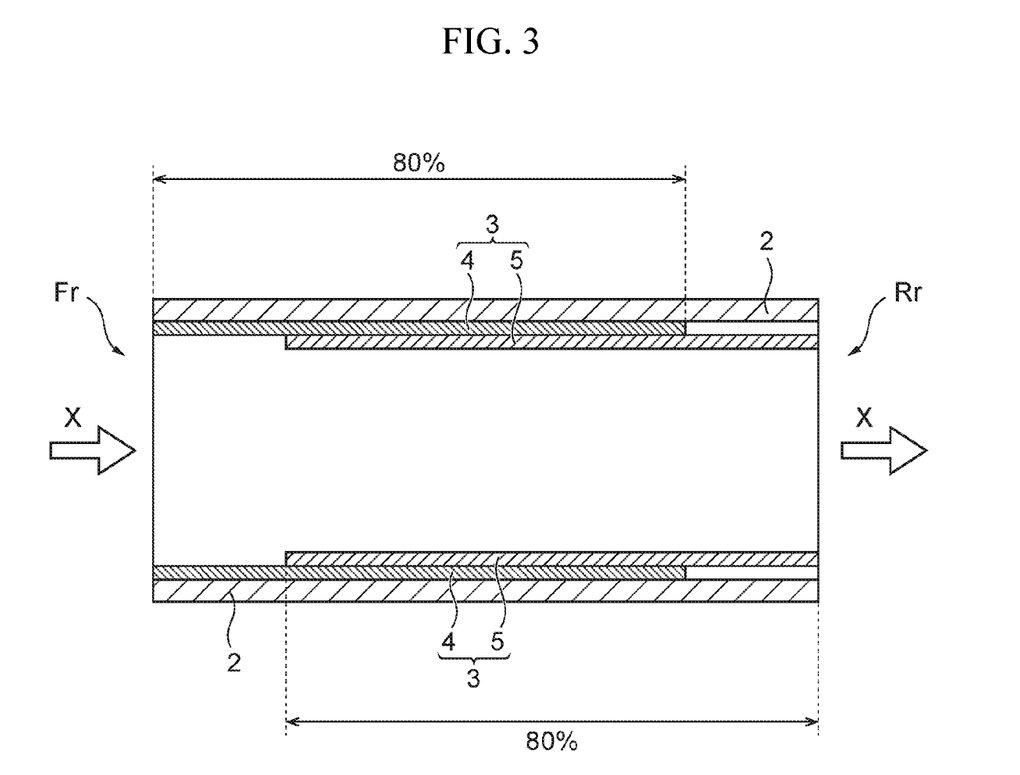
FIG. 3 is a longitudinal sectional view illustrating an embodiment of a catalyst layer.

FIG. 1 is a schematic view of the catalytic converter of the present invention. FIG. 2 is a partially enlarged view of a cell. FIG. 3 is a longitudinal sectional view illustrating an embodiment of a catalyst layer.

A catalytic converter 10 shown in FIG. 1 generally includes a cylindrical substrate 1 with a number of cells and a catalyst layer 3 formed on the surface of a cell wall 2 of each cell as shown in FIG. 2.

Herein, examples of the substrate 1 include cordierite made of a composite oxide of magnesium oxide, aluminum oxide, and silicon dioxide, ceramic materials, such as silicon carbide, and materials other than ceramic materials, such as metal materials.

The substrate 1 has a honeycomb structure with a number of cells whose lattice contour is a quadrangle, a hexagon, an octagon, or the like. Exhaust gas, which has entered a cell at an end of the substrate 1 on the upstream side (Fr side) of the exhaust gas flow direction, flows through the substrate 1, and is purified in this process, and then, the purified exhaust gas flows out from an end of the substrate 1 on the downstream side (Rr side) of the exhaust gas flow direction (x-direction).

Next, an embodiment of the catalyst layer will be described with reference to FIGS. 2 and 3.

The catalyst layer 3 shown in FIGS. 2 and 3 includes a lower catalyst layer 4 that is formed on the surface of a cell wall 2 and an upper catalyst layer 5 that is formed on the surface of the lower catalyst layer 4.

The lower catalyst layer 4 is formed in the range of 80% of the total length of the substrate 1 from the end of the substrate 1 on the upstream side Fr of the exhaust gas flow direction, while the upper catalyst layer 5 is formed in the range of 80% of the total length of the substrate 1 from the end of the substrate 1 on the downstream side Rr of the exhaust gas flow direction.

Herein, the lower catalyst layer 4 contains an alumina support ($Al_2O_3$) with platinum (Pt) carried thereon, and a ceria-zirconia-based composite oxide ($CeO_2$—$ZrO_2$ composite oxide).

Meanwhile, the upper catalyst layer 5 contains a zirconia support ($ZrO_2$) with rhodium (Rh) carried thereon, and two types of ceria-zirconia-based composite oxides ($CeO_2$—$ZrO_2$ composite oxides) with different specific surface areas, and further contains alumina ($Al_2O_3$).

Regarding the two types of ceria-zirconia-based composite oxides with different specific surface areas, the specific surface area of the ceria-zirconia-based composite oxide with a larger specific surface area is greater than or equal to 40 $m^2/g$, while the specific surface area of the ceria-zirconia-based composite oxide with a smaller specific surface area is less than or equal to 4 $m^2/g$.

In the upper catalyst layer 5, rhodium (Rh) is carried only on zirconia ($ZrO_2$) that does not contain ceria. Such a structure can improve the $NO_x$ purification rate. This has been verified through experiments described below.

As the upper catalyst layer 5 contains a ceria-zirconia-based composite oxide with a large specific surface area and a ceria-zirconia-based composite oxide with a small specific surface area, more specifically, as the upper catalyst layer 5 contains a composite oxide with a large specific surface area by an amount of greater than or equal to 12 g/L and also contains a composite oxide with a small specific surface area by an amount of greater than or equal to 8 g/L, it is possible to suppress a pressure loss while exhibiting excellent OSC performance. This has been also verified through experiments described below.

In addition, the zirconia support with rhodium carried thereon is contained in the upper catalyst layer 5 by an amount of 40 g/L.

When the amount of the zirconia support with rhodium carried thereon is increased, the low-temperature activity, in particular, is improved. However, if the amount of the zirconia support is increased too much, a pressure loss is increased. Thus, from the perspective of achieving both excellent low-temperature activity and suppressed pressure loss, the amount of the zirconia support with rhodium carried thereon is defined as 40 g/L. This has been also verified through experiments described below.

(Experiments for identifying the relationship between the Ce concentration in the Rh support and the $NO_x$ purification rate, experiments for identifying the relationship between the added amounts of a high SSA composite oxide and a low SSA composite oxide in the upper catalyst layer and the $NO_x$ purification rate, and experiments for identifying the relationship between the amount of the Rh support and a pressure loss and the relationship between the amount of the Rh support and the purification temperature of low-temperature active $NO_x$)

The inventors have conducted experiments for identifying the relationship between the Ce concentration in the Rh layer and the $NO_x$ purification rate, experiments for identifying the relationship between the added amounts of a high SSA composite oxide and a low SSA composite oxide in the upper catalyst layer and the $NO_x$ purification rate, and experiments for identifying the relationship between the amount of the Rh support and a pressure loss and the relationship between the amount of the Rh support and the purification temperature of low-temperature active $NO_x$. Reference Examples 1-12, Example 1, and Comparative Examples 1-4 were produced using methods described below.

Reference Example 1

In Reference Example 1, the lower catalyst layer contains Pt as a catalyst ($Pt(0.2)/Al_2O_3(25)+CZ(30)$), and the upper catalyst layer contains Rh as a catalyst ($Rh(0.12)/Ce$—Zr composite oxide $A(40)+Al_2O_3(20)$). Herein, the unit of the numerical values in the parentheses is g/L. First, using nitric acid Pt, $Pt/Al_2O_3$ (i.e., material 1) in which Pt is carried on $Al_2O_3$ was prepared. Impregnation was used as a method for causing Pt to be carried on $Al_2O_3$. Next, a slurry 1 was prepared by pouring the material 1, a CZ material, and a $Al_2O_3$-based binder into distilled water while agitating them. Further, the prepared slurry 1 was poured into a substrate, and unnecessary portions were wiped away with a blower, so that the wall surface of the substrate was coated with the slurry 1. At that time, the coating material for the Pt layer was prepared such that the content of Pt, the content of the material 1, and the content of the CZ material with respect to the volume of the substrate were 0.2 g/L, 25 g/L, and 30 g/L, respectively. Finally, moisture was dried with a dryer kept at 120° C. for two hours, and baking was performed with an electric furnace at 500° C. for 2 hours. Likewise, using nitric acid Rh, a Rh/Ce—Zr composite oxide A (i.e., material 2) in which Rh is carried on a Ce—Zr composite oxide A was prepared. Herein, the proportion of Ce in the Ce—Zr composite oxide A was 30 mass %. Next, a slurry 2 was prepared by pouring the material 2, $Al_2O_3$, and an $Al_2O_3$-based binder into distilled water while agitating them such that the materials were suspended in the distilled water. The prepared slurry 2 was poured into the coated substrate, and unnecessary portions were wiped away with a blower, so that the wall surface of the substrate was coated with the slurry 2. At that time, the coating material for the Rh layer was prepared such that the content of Rh, the content of the material 2, and the content of $Al_2O_3$ with respect to the volume of the substrate were 0.12 g/L, 40 g/L, and 20 g/L, respectively. Finally, moisture was dried with a dryer kept at 120° C. for two hours, and baking was performed with an electric furnace at 500° C. for 2 hours.

Reference Examples 2, 3, and 4

In each of Reference Examples 2, 3, and 4, the lower catalyst layer contains Pt as a catalyst ($Pt(0.2)/Al_2O_3(25)+CZ(30)$), and the upper catalyst layer contains Rh as a catalyst ($Rh(0.12)/Ce$—Zr composite oxide $B,C,D(40)+Al_2O_3(20)$). A slurry was prepared by changing the specifications of the Rh support (material 2) used for the slurry 2 in Reference Example 1, and then, coating, drying, and baking were performed. With respect to the catalyst, the process was unchanged except that the composition of the material 2 shown in Reference Example 1 was changed. In Reference Example 2, a Ce—Zr composite oxide that contains a Ce concentration of 0 mass % (B) was used; in Reference Example 3, a Ce—Zr composite oxide that contains a Ce concentration of 20 mass % (C) was used; and in Reference Example 4, a Ce—Zr composite oxide that contains a Ce concentration of 60 mass % (D) was used.

Reference Examples 5, 6, 7, and 8

In each of Reference Examples 5, 6, 7, and 8, the lower catalyst layer contains Pt as a catalyst ($Pt(0.2)/Al_2O_3(25)+CZ(30)$), and the upper catalyst layer contains Rh as a catalyst (Rh layer $Rh(0.12)/Ce$—Zr composite oxide $B(40)+Al_2O_3(20)+$low SSA Ce—Zr composite oxide(4,8,12,16)). A slurry was prepared by further pouring each amount of a low SSA Ce—Zr composite oxide into the slurry 2 in Reference Example 1, and then, coating, drying, and baking were performed. With respect to the catalyst, the process was unchanged except that a low SSA Ce—Zr composite oxide was added in the step of preparing the slurry 2 in Reference Example 1. In Reference Example 5, 4 parts by mass of a low SSA Ce—Zr composite oxide was added; in Reference Example 6, 8 parts by mass of a low SSA Ce—Zr composite oxide was added; in Reference Example 7, 12 parts by mass of a low SSA Ce—Zr composite oxide was added; and in Reference Example 8, 16 parts by mass of a low SSA Ce—Zr composite oxide was added. It should be noted that the "low SSA Ce—Zr composite oxide" herein means a material that initially has an SSA of less than or equal to 4 $m^2/g$.

Reference Examples 9, 10, 11, and 12

In each of Reference Examples 9, 10, 11, and 12, the lower catalyst layer contains Pt as a catalyst ($Pt(0.2)/Al_2O_3(25)+CZ(30)$), and the upper catalyst layer contains Rh as a catalyst ($Rh(0.12)/Ce$—Zr composite oxide $B(40)+Al_2O_3(20)+$high SSA Ce—Zr composite oxide (4,8,12,16)). A slurry 2 was prepared by further pouring each amount of a high SSA Ce—Zr composite oxide into the slurry 2 in Reference Example 1, and then, coating, drying, and baking were performed. With respect to the catalyst, the process was unchanged except that a high SSA Ce—Zr composite oxide was added in the step of preparing the slurry 2 in Reference Example 1. In Reference Example 9, 4 parts by mass of a high SSA Ce—Zr composite oxide was added; in Reference Example 10, 8 parts by mass of a high SSA Ce—Zr composite oxide was added; in Reference Example 11, 12 parts by mass of a high SSA Ce—Zr composite oxide was added; and in Reference Example 12, 16 parts by mass of a high SSA Ce—Zr composite oxide was added. It should be noted that the "high SSA Ce—Zr composite oxide" herein means a material that initially has an SSA of greater than or equal to 40 $m^2/g$.

Example 1 and Comparative Examples 1, 2, 3, and 4

In each of Example 1 and Comparative Examples 1, 2, 3, and 4, the lower catalyst layer contains Pt as a catalyst ($Pt(0.2)/Al_2O_3(25)+CZ(30)$), and the upper catalyst layer contains Rh as a catalyst ($Rh(0.12)/Ce$—Zr composite oxide $B(x)+Al_2O_3(20)+$low SSA Ce—Zr composite oxide(8)+high SSA Ce—Zr composite oxide (12)). A slurry was prepared by changing the Rh support of the slurry 2 in Reference Example 1 to a Ce—Zr composite oxide B that contains 0 mass % C and pouring 8 parts by mass of a low SSA Ce—Zr composite oxide and 12 parts by mass of a high SSA Ce—Zr composite oxide into the slurry 2, and then, coating, drying, and baking were performed. With respect to the catalyst, the process was unchanged except that the material for the step of preparing the slurry 2 in Reference Example 1 was changed. In Comparative Example 1, 24 parts by mass of a Ce—Zr composite oxide B was added; in Comparative Example 2, 32 parts by mass of a Ce—Zr composite oxide B was added; in Example 1, 40 parts by mass of a Ce—Zr composite oxide B was added; in Comparative Example 3, 48 parts by mass of a Ce—Zr composite oxide B was added; and in Comparative Example 4, 56 parts by mass of a Ce—Zr composite oxide B was added.

<Evaluation Method>

A 4.3 L V8 cylinder gasoline engine was used, and the bed temperature of a catalyst on the downstream side was set to 950° C., so that a cycle that includes feedback, fuel cut, rich, and lean per minute as a condition was conducted for 50 hours.

To measure the $NO_x$ purification rate under fluctuating conditions of the A/F ratio, a catalyst layer on the upstream side that an aged catalytic converter was mounted, and the purification rate for when the entering gas atmosphere was periodically switched between the rich and lean sides of the A/F ratio was measured. In addition, to measure the NO purification rate under the steady rich condition, an aged catalytic converter was mounted, and the purification rate for when the entering gas atmosphere was continuously maintained on the rich side of the A/F ratio was measured. Further, to measure a pressure loss, a pressure loss for when air was supplied to a catalyst at a constant flow rate (6 $m^3$/minute) was measured. Furthermore, regarding $NO_x$ light-off performance $NO_x$-T50, the temperature that had increased from a low temperature under the rich environment and at which the NO purification rate reached 50% was measured.

Table 1 below shows the materials used herein.

TABLE 1

| Portion | Name of Material | Producer | Composition |
|---|---|---|---|
| Upper Catalyst Layer (Rh Layer) | Ce—Zr Composite Oxide | TOYOTA MOTOR CORPORATION | $CeO_2$ (x mass %), $ZrO_2$ (100-x mass %) |
| | High, Low SSA Ce—Zr Composite Oxide | TOYOTA MOTOR CORPORATION | $Al_2O_3$ (30 mass %), $CeO_2$ (20 mass %), $ZrO_2$ (40 mass %), $Y_2O_3$ (4 mass %), $Nd_2O_3$ (2 mass %), $La_2O_3$ (4 mass %) |
| | Alumina | Sasol | $Al_2O_3$ (99 mass %), $La_2O_3$ (1 mass %) |
| Lower Catalyst Layer (Pt Layer) | CZ Material | Rhodia | $CeO_2$ (30 mass %), $ZrO_2$ (60 mass %), $La_2O_3$ (5 mass %), $Y_2O_3$ (5 mass %) |
| | Alumina | Sasol | $Al_2O_3$ (99 mass %), $La_2O_3$ (1 mass %) |

<Results of Experiment>

Figure 4:
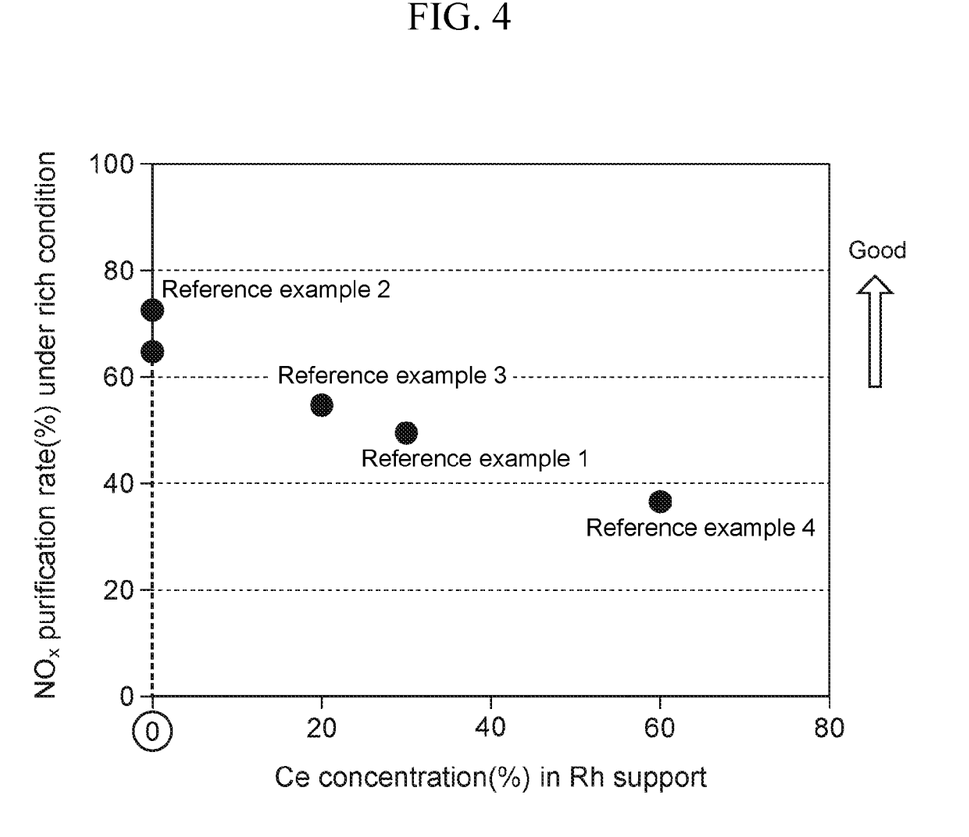
FIG. 4 is a graph showing the experimental results for identifying the relationship between the Ce concentration in the Rh support and the $NO_x$ purification rate.
Figure 5:
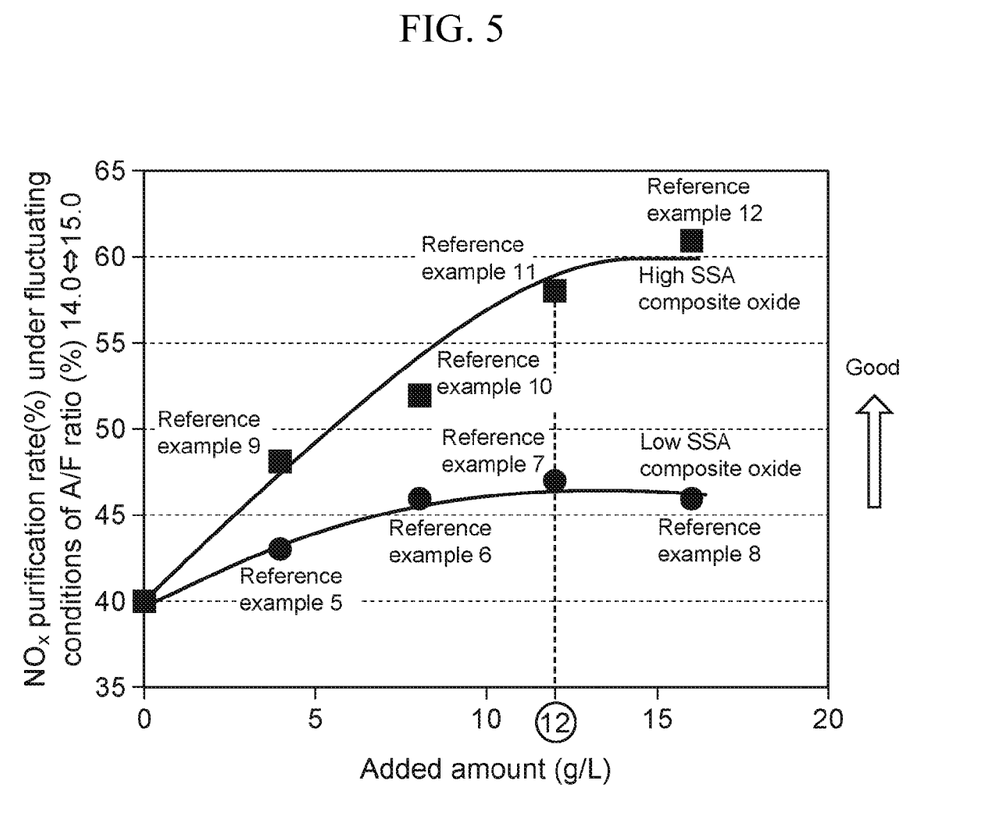
FIG. 5 is a graph showing the experimental results for identifying the relationship between the added amounts of a high SSA composite oxide and a low SSA composite oxide in the upper catalyst layer and the $NO_x$ purification rate.
Figure 6:
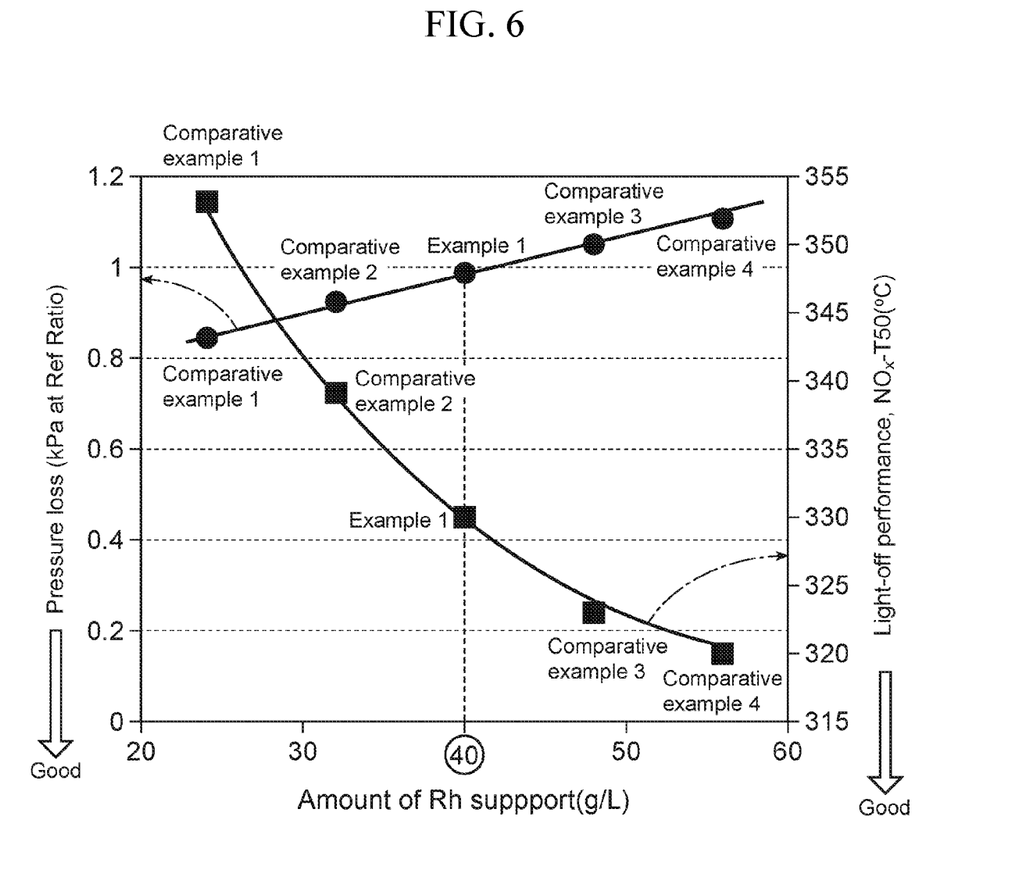
FIG. 6 is a graph showing the experimental results for identifying the relationship between the amount of the Rh support and a pressure loss and the relationship between the amount of the Rh support and the purification temperature of low-temperature active $NO_x$.

FIGS. 4 to 6 each show the experimental results. Herein, FIG. 4 is a graph showing the experimental results for identifying the Ce concentration in the Rh support and the $NO_x$ purification rate. In addition, FIG. 5 is a graph showing the experimental results for identifying the relationship between the added amounts of a high SSA composite oxide and a low SSA composite oxide in the upper catalyst layer and the $NO_x$ purification rate. Further, FIG. 6 is a graph showing the experimental results for identifying the relationship between the amount of the Rh support and a pressure loss and the relationship between the amount of the Rh support and the $NO_x$ light-off performance.

FIG. 4 can confirm that regarding the Ce concentration in the Rh support, the catalytic activity becomes the highest when the concentration is 0%. Accordingly, a Ce concentration of 0% in Reference Example 2 is adopted. It is considered that the activity of Rh is improved with a reduction in the amount of bases in the Rh support.

In addition, FIG. 5 can confirm that the OSC performance of a low SSA-OSC material is saturated when it is added by an amount of greater than or equal to 8 g/L, and the OSC performance of a high SSA-OSC material is also saturated when it is added by an amount of greater than or equal to 12 g/L from the difference from the required OSC performance, and thus that the low SSA-OSC material is preferably added by an amount of greater than or equal to 8 g/L and the high SSA-OSC material is preferably added by an amount of greater than or equal to 12 g/L. It should be noted that the low SSA-OSC material is useful for reducing a pressure loss as it has a small volume relative to its weight. However, the low SSA-OSC material has a limitation in the oxygen release capacity of the OSC performance. Thus, compensating for the OSC performance that is insufficient with the low SSA-OSC by using a high-SSA OSC material can achieve both excellent OSC performance and a reduction in the pressure loss.

In addition, FIG. 6 can confirm that when the amount of the Rh support is increased, the light-off performance is improved, but a pressure loss is increased.

Increasing the amount of the Rh support to increase the dispersibility of Rh is useful, and the light-off performance will be improved with an increase in the amount of the Rh support. Meanwhile, as a pressure loss tends to increase, a Rh support with an amount of 40 g/L, which is shown by Example 1, can be defined as the optimal amount of the Rh support.

It should be noted that the results shown in FIG. 6 indicate not a point that Comparative Examples 1-4 should be excluded from the scope of the present invention, but a point that Example 1 has an optimal amount of the Rh support that can achieve both excellent OSC performance and a reduction in the pressure loss.

Although the embodiments of the present invention have been described in detail with reference to the drawings, specific structures are not limited thereto, and any design changes that may occur within the spirit and scope of the present invention are all included in the present invention.

DESCRIPTION OF SYMBOLS

1 Substrate
2 Cell Wall
3 Catalyst Layer
4 Lower Catalyst Layer
5 Upper Catalyst Layer
10 Catalytic converter
Fr Upstream side of the exhaust gas flow direction
Rr Downstream side of the exhaust gas flow direction

What is claimed is:
1. A catalytic converter comprising:
a substrate with a cell structure through which exhaust gas flows; and a catalyst layer formed on a cell wall surface of the substrate, wherein the catalyst layer includes a lower catalyst layer and an upper catalyst layer, the lower catalyst layer being formed on a surface of the substrate, and the upper catalyst layer being formed on a surface of the lower catalyst layer, the upper catalyst layer includes at least a zirconia support with rhodium carried thereon, and two types of ceria-zirconia-based composite oxides with different specific surface areas, each of the ceria-zirconia-based composite oxides having no rhodium carried thereon, and the lower catalyst layer includes an alumina support with platinum carried thereon, and a ceria-zirconia-based composite oxide, of the two types of ceria-zirconia-based composite oxides with different specific surface areas, the ceria-zirconia-based composite oxide with a larger specific surface area has a specific surface area of greater than or equal to 40 $m^2/g$, and the ceria-zirconia-based composite oxide with a smaller specific surface area has a specific surface area of less than or equal to 4 $m^2/g$, wherein, of the two types of ceria-zirconia-based composite oxides with different specific surface areas, the ceria-zirconia-based composite oxide with a larger specific surface area is contained in the upper catalyst layer by an amount of greater than or equal to 12 g/L, and the ceria-zirconia-based composite oxide with a smaller specific surface area is contained in the upper catalyst layer by an amount of greater than or equal to 8 g/L.

2. The catalytic converter according to claim 1, wherein the zirconia support with rhodium carried thereon is contained in the upper catalyst layer by an amount of 40 g/L.

* * * * *